United States Patent Office 2,974,138
Patented Mar. 7, 1961

2,974,138

18,20-EPOXYPREGNANES AND DERIVATIVES THEREOF

Raphael Pappo, Skokie, Ill., assignor to G. D. Searle & Co., Chicago, Ill., a corporation of Delaware No Drawing. Filed Apr. 13, 1960, Ser. No. 21,852

7 Claims. (Cl. 260—239.55)

The present invention is concerned with novel 18,20-epoxysteroids and, more particularly, with 18,20-epoxysteroids of the 3,5-cyclopregnane and pregn-5-ene series, as represented by the structural formulae

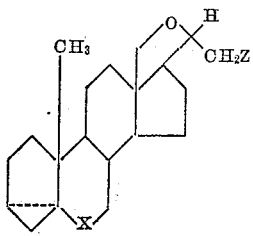

and

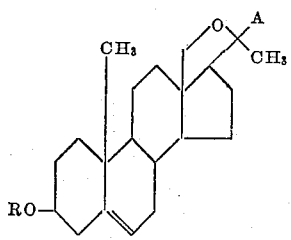

wherein X is a member of the class consisting of carbonyl and hydroxymethylene groups, Z is selected from the group consisting of hydrogen and iodo radicals, R is selected from a group consisting of hydrogen and lower alkanoyl radicals, and A is selected from the group consisting of hydrogen and ethylthio (—SC$_2$H$_5$) radicals.

The lower alkanoyl radicals represented by R are typified by formyl, acetyl, propionyl, butyryl, valeryl, caproyl, and the branched-chain isomers thereof.

A novel compound also encompassed by the present invention is 18,20-epoxypregn-4-en-3-one, which is obtained by the Oppenauer oxidation of the compound represented by the structural formula supra, wherein A and R are hydrogen.

A starting material suitable for the manufacture of the instant compounds is 18,20-epoxy-21-hydroxy-3,5-cyclopregnan-6-one p-toluenesulfonate. Treatment of the latter ester with an alkali metal iodide such as sodium iodide in a suitable inert polar solvent, for example acetonitrile, results in 18,20-epoxy-21-iodo-3,5-cylco-pregnan-6-one. Hydrogenolysis of this iodo compound by treatment with gaseous hydrogen in the presence of a suitable catalyst such as 10% palladium-on-carbon affords 18,20-epoxy-3,5-cyclopregnan-6-one. This ketone is reduced, typically with sodium borohydride in aqueous methanol, to yield 18,20-epoxy-3,5-cyclopregnan-6-ol, a mixture of the 6α and 6β isomers, which is isomerized and acylated by means of formic acid in the presence of triethylamine to produce 18,20-epoxy-3β-formoxypregn-5-ene. Treatment of this ester with aqueous sodium hydroxide in methanol followed by acylation with acetic anhydride in pyridine produces 3β-acetoxy-18,20-epoxypregn-5-ene. This acetate is hydrolyzed by means of aqueous sodium hydroxide in methanol to afford 18,20-epoxypregn-5-en-3β-ol.

The aforementioned 18,20-epoxypregn-5-en-3β-ol can be obtained also by the following sequence of reactions. Treatment of 21-dimethylamino-18,20-epoxypregn-5-en-3β-ol with acetic anhydride in pyridine affords the 3β-acetate, which is reacted with aqueous hydrogen peroxide in methanol to produce 3β-acetoxy-21-dimethylamino-18,20-epoxypregn-5-ene N-oxide. This tertiary amine oxide is decomposed by heating in a high-boiling inert solvent, for example tertiary-butylbenzene, to afford 3β-acetoxy-18,20-epoxy-pregna-5,20-diene. The addition of ethyl mercaptan to the unsaturated linkage at carbon 20 results in 3β-acetoxy-18,20-epoxy-20-ethylthiopregn-5-ene. Reduction of the latter thioether with lithium and liquid ammonia produces, after reacetylation, the aforementioned 3β-acetoxy-18,20-epoxypregn-5-ene. Alternatively, 3β-acetoxy-18,20-ethylthiopregn-5-ene is hydrolyzed with dilute aqueous sodium hydroxide in methanol to yield the corresponding 3β-ol, which is reduced with lithium and liquid ammonia to achieve 18,20-epoxypregn-5-en-3β-ol, described supra.

Oppenauer oxidation of the foregoing 18,20-epoxypregn-5-en-3β-ol, i.e. treatment with aluminum isopropoxide and cyclohexanone, yields 18,20-epoxypregn-4-en-3-one. This epoxide is treated with aqueous chromic acid to afford 18,20-epoxy-hpdroxypregn-4-ene-3,18-dione.

Treatment of the aforementioned 18,20-epoxy-pregn-5-en-3β-ol with a lower alkanoic acid anhydride affords the instant 3β-(lower alkanoyl)oxy-18,20-epoxy-pregn-5-enes. For example, this alcohol is acylated with propionic anhydride in pyridine to produce 18,20-epoxy-3β-propionoxypregn-5-ene.

As described supra, the compounds of this invention are useful as intermediates in the manufacture of 18,20-epoxy-20-hydroxypregn-4-ene-3,18-dione, which is an aldosterone inhibitor as is disclosed in U.S. Patent 2,907,758, column 9, lines 20—21; and also in my copending application Serial No. 841,946, filed September 24, 1959.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees Centigrade (° C.). Quantities of materials are expressed in parts by weight unless otherwise noted.

*Example 1*

A mixture of 5 parts of 18,20-epoxy-21-hydroxy-3,5-cyclopregnan-6-one p-toluenesulfonate, 10 parts of sodium iodide, and 63 parts of acetonitrile is kept at 40–50° for about 3 days, then concentrated to dryness at reduced pressure. This residue is treated with ether and water, and the organic layer is separated, washed successively with aqueous sodium bisulfite, aqueous sodium hydroxide, and water; dried over anhydrous sodium sulfate, and evaporated to dryness in an atmosphere of nitrogen. Crystallization of the residue from ether affords 18,20 - epoxy - 21-iodo-3,5-cyclopregnan-6-one, M.P. about 134–136°. Recrystallization from methylcyclohexane raises the melting point to about 135–136°.

*Example 2*

To a solution of 2.77 parts of 18,20-epoxy-21-iodo-3,5-cyclopregnan-6-one and 0.4 part of sodium hydroxide in 200 parts of 90% aqueous ethanol is added one part of 10% palladium-on-carbon catalyst, and the mixture is stirred under hydrogen at atmospheric pressure until the theoretical quantity of gas is absorbed. The catalyst is removed by filtration and the filtrate is concentrated to a small volume in vacuo. The residue is extracted with benzene and the extract is washed with water, dried over anhydrous sodium sulfate, and evaporated to dryness under nitrogen. Crystallization of this crude product from methylcyclohexane yields 18,20-epoxy-3,5-cyclopregnan-6-one, M.P. about 132–134°.

*Example 3*

A solution of 2 parts of 18,20-epoxy-3,5-cyclopregnan-6-one in 80 parts of methanol is treated with a solution of 2 parts of sodium borohydride in 20 parts of water, and the mixture is stored at room temperature for about 4 hours. Dilution of the reaction mixture with water results in crystallization of the product, which is collected by filtration and dried to afford 18,20-epoxy-3,5-cyclopregnan-6-ol, M.P. about 137–143°.

Fractional crystallization of this mixture from methylcyclohexane yields 18,20-epoxy-3,5-cyclopregnan-6α-ol and 18,20-epoxy-3,5-cyclopregnan-6β-ol.

*Example 4*

To a solution of 1.46 parts of triethylamine in 48.8 parts of anhydrous formic acid is added 1.9 parts of 18,20-epoxy-3,5-cyclopregnan-6-ol, and the resulting solution is allowed to stand at room temperature for about 16 hours. The reaction mixture is diluted with water and extracted with benzene and the organic layer is separated, washed successively with water, aqueous potassium carbonate, and water; dried over anhydrous sodium sulfate, and concentrated to dryness under nitrogen to afford crystals of 18,20-epoxy-3β-formoxypregn-5-ene, M.P. about 139–144°.

*Example 5*

A solution of 1.9 parts of 18,20-epoxy-3β-formoxypregn-4-ene in 80 parts of methanol is treated with 20 parts of 10% aqueous sodium hydroxide, and this reaction mixture is heated at reflux for about one hour. The solution is then cooled, diluted with water, and extracted with benzene. The organic solution is washed with water, dried over anhydrous sodium sulfate, and evaporated to dryness under nitrogen. The latter residue is mixed with 10 parts of acetic anhydride and 20 parts of pyridine and the resulting mixture allowed to stand at room temperature for about 16 hours. Dilution with water results in crystallization of the product, which is collected by filtration and dried to yield 3β-acetoxy-18,20-epoxypregn-5-ene, M.P. about 160–165°.

*Example 6*

A mixture of one part of 3β-acetoxy-18,20-epoxypregn-5-ene, 5 parts of 10% aqueous sodium hydroxide, and 16 parts of methanol is heated on the steam bath for about 2 hours, then diluted with water and extracted with benzene. The benzene solution is washed with water, dried over anhydrous sodium sulfate, and evaporated to dryness in an atmosphere of nitrogen to afford 18,20-epoxypregn-5-en-3β-ol, M.P. about 142–153°.

*Example 7*

A mixture of 2 parts of 21-dimethylamino-18,20-epoxypregn-5-en-3β-ol, 10 parts of acetic anhydride, and 20 parts of pyridine is stored at room temperature for about 15 hours, then diluted with water and extracted with benzene. This organic extract is washed successively with dilute hydrochloric acid and water, dried over anhydrous sodium sulfate, and concentrated at reduced pressure to yield 3β-acetoxy-21-dimethylamino-18,20-epoxypregn-5-ene, M.P. about 142–144°.

*Example 8*

A suspension of 28 parts of 3β-acetoxy-21-dimethylamino-18,20-epoxypregn-5-ene in 160 parts of methanol is treated with 12 parts of 30% aqueous hydrogen peroxide, and the mixture is stirred at room temperature for about 24 hours. This reaction mixture is then treated with a second portion of 12 parts of 30% aqueous hydrogen peroxide, and the resulting solution allowed to stand at room temperature for about 16 hours. To this solution is added 0.5 part of platinum oxide in order to decompose the excess hydrogen peroxide, then the mixture filtered and the filtrate evaporated to dryness at reduced pressure to afford 3β-acetoxy-21-dimethylamino-18-epoxypregn-5-ene N-oxide.

The aforementioned N-oxide is dried by azeotropic distillation with tertiary-butylbenzene at 0.5 mm. pressure. The resulting product is mixed with 350 parts of tertiary-butylbenzene, and this mixture distilled slowly at atmospheric pressure under nitrogen until about 175 parts of solvent are collected. The residual solution is cooled and concentrated to dryness at 0.5 mm. pressure, keeping the temperature below about 80°. The residue is crystallized from benzene to produce 3β-acetoxy-18,20-epoxypregn-5,20-diene, M.P. about 178–182°.

*Example 9*

To a suspension of 15 parts of 3β-acetoxy-18,20-epoxypregn-5,20-diene in 88 parts of benzene is added, with stirring, 8.4 parts of ethyl mercaptan and 0.2 part of p-toluenesulfonic acid monohydrate. The mixture, which becomes homogeneous after a few minutes, is allowed to stand at room temperature for about 16 hours, then washed successively with dilute aqueous sodium hydroxide and water, dried over anhydrous sodium sulfate, and concentrated to dryness to afford 3β-acetoxy-18,20-epoxy-20-ethylthiopregn-5-ene as a partially crystalline solid. The infrared absorption maximum at 12.6 microns characteristic of the starting material is absent from this product.

*Example 10*

A mixture of 5 parts of 3β-acetoxy-18,20-epoxy-20-ethylthiopregn-5-ene, 25 parts of 10% aqueous sodium hydroxide, and 100 parts of methanol is allowed to react according to the procedure of Example 6 to yield 18,20-epoxy-20-ethylthiopregn-5-en-3β-ol.

*Example 11*

To a solution of 140 parts of liquid ammonia in 48 parts of tertiary butyl alcohol is added a solution of 1.5 parts of 3β-acetoxy-18,20-epoxy-20-ethylthiopregn-5-ene in 43 parts of ether. This reaction mixture is treated with 2.2 parts of lithium metal, then stirred for about 4 hours, after which period of time the blue color of the mixture has disappeared. A quantity of methanol amounting to 16 parts is added, and the resulting mixture is evaporated to dryness under nitrogen. The residue is extracted with ether and this extract washed with water, dried over anhydrous sodium sulfate, and concentrated to dryness in vacuo.

This remaining material is mixed with 10 parts of acetic anhydride and 20 parts of pyridine, and the mixture is stored at room temperature for about 16 hours. Crushed ice is then added and the resulting mixture is extracted with benzene. The benzene layer is washed successively with cold dilute hydrochloric acid, water, dilute sodium hydroxide, and water; dried over anhydrous sodium sulfate, and concentrated to yield crystals of 3β-acetoxy-18,20-epoxypregn-5-ene, which is identical with the product obtained in Example 5.

*Example 12*

The treatment of 18,20-epoxy-20-ethylthiopregn-5-en-3β-ol with lithium and liquid ammonia according to the procedure described in Example 11 results in 18,20-epoxypregn-5-en-3β-ol, which is identical with the substance described in Example 6.

Example 13

A solution of 2 parts of 18,20-epoxypregn-5-en-3β-ol and 19 parts of cyclohexanone in 63.5 parts of toluene is distilled slowly until free of moisture. This solution is then treated with 2.3 parts of alumium isopropoxide, and distillation continued for about 40 minutes, during which time about 17 parts of distillate is collected. This reaction mixture is cooled, diluted with cold dilute hydrochloric acid, and extracted with ether. The ether layer is washed with water, dried over anhydrous sodium sulfate, and concentrated to a small volume under nitrogen. Further concentration at 0.01 mm. pressure affords 18,20-epoxypregn-4-en-3-one, which displays a maximum in the ultraviolet at 241 millimicrons with a molecular extinction coefficient of 16,000.

Example 14

To a solution of 6.25 parts of 18,20-epoxypregn-4-en-3-one in 160 parts of acetone is added dropwise, over a period of about 8 hours, 20 parts by volume of an aqueous solution, 8 Normal in chromium trioxide and 8 Normal in sulfuric acid. This reaction mixture is stirred at room temperature for about 16 hours, then extracted with benzene. The organic layer is separated and extracted with several portions of aqueous potassium carbonate. The extracts are combined, acidified with dilute hydrochloric acid, and extracted with chloroform. The chloroform solution is separated, washed with water, dried over anhydrous sodium sulfate, and concentrated to dryness. Crystallization of the residue from acetone affords 18,20-epoxy-20-hydroxypregn-4-ene-3,18-dione, M.P. 225–227°.

What is claimed is:

1. A compound of the formula

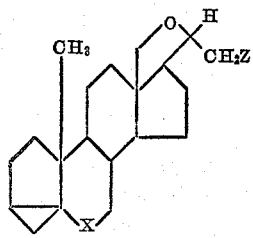

wherein X is a member of the class consisting of carbonyl and hydroxymethylene groups and Z is selected from the group consisting of hydrogen and iodo radicals.

2. A compound of the formula

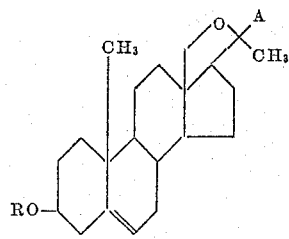

wherein R is selected from the group consisting of hydrogen and lower alkanoyl radicals, and A is selected from the group consisting of hydrogen and ethylthio radicals.

3. 18,20-epoxypregn-4-en-3-one.
4. 3β-acetoxy-18,20-epoxy-20-ethylthiopregn-5-ene.
5. 18,20-epoxy-3,5-cyclopregnan-6-one.
6. 18,20-epoxy-21-iodo-3,5-cyclopregnan-6-one.
7. 18,20-epoxy-3,5-cyclopregnan-6-ol.

References Cited in the file of this patent
UNITED STATES PATENTS

| | | |
|---|---|---|
| 2,891,948 | Pappo | June 23, 1959 |
| 2,907,758 | Pappo | Oct. 6, 1959 |

UNITED STATES PATENT OFFICE
CERTIFICATION OF CORRECTION

Patent No. 2,974,138                      March 7, 1961

Raphael Pappo

It is hereby certified that error appears in the above numbered patent requiring correction and that the said Letters Patent should read as corrected below.

Column 2, line 29, for "18,20-epoxy-hpdroxypregn-4-ene-3,18-dione" read -- 18,20-epoxy-20-hydroxypregn-4-ene-3,18-dione --; column 5, lines 35 to 45, the structural formula should appear as shown below instead of as in the patent:

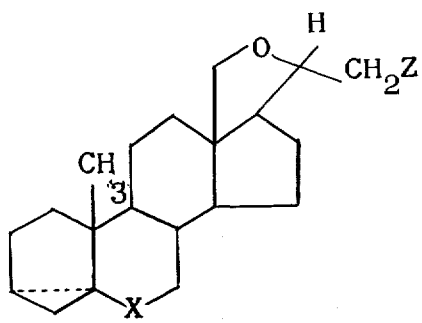

Signed and sealed this 31st day of October 1961.

(SEAL)
Attest:

ERNEST W. SWIDER                      DAVID L. LADD
Attesting Officer                    Commissioner of Patents